(12) United States Patent
Casey et al.

(10) Patent No.: US 10,440,076 B2
(45) Date of Patent: Oct. 8, 2019

(54) MEDIA SEEK MECHANISMS

(71) Applicant: MobiTV, Inc., Emeryville, CA (US)

(72) Inventors: David Casey, Orinda, CA (US);
Tommy Isaksson, San Francisco, CA (US); Kelvin Komensen, Fremont, CA (US); Fidel Zawde, Oakland, CA (US); Bob Carlson, Burlingham, CA (US)

(73) Assignee: MobiTV, Inc., Emeryville, CA (US)

( * ) Notice: Subject to any disclaimer, the term of this patent is extended or adjusted under 35 U.S.C. 154(b) by 126 days.

(21) Appl. No.: 14/642,814

(22) Filed: Mar. 10, 2015

(65) Prior Publication Data

US 2016/0269455 A1   Sep. 15, 2016

(51) Int. Cl.
| | |
|---|---|
| *H04L 29/06* | (2006.01) |
| *G06F 3/0484* | (2013.01) |
| *G06F 3/0488* | (2013.01) |
| *G11B 27/10* | (2006.01) |
| *H04N 21/40* | (2011.01) |

(52) U.S. Cl.
CPC ...... *H04L 65/4069* (2013.01); *G06F 3/04842* (2013.01); *G06F 3/04847* (2013.01); *G06F 3/04883* (2013.01); *G11B 27/102* (2013.01); *H04N 21/40* (2013.01)

(58) Field of Classification Search
CPC ............. H04L 65/4069; G06F 3/04842; G06F 3/04847; G06F 3/04883; G11B 27/00
USPC ........................................................ 709/219
See application file for complete search history.

(56) References Cited

U.S. PATENT DOCUMENTS

| | | | | |
|---|---|---|---|---|
| 8,060,638 B1* | 11/2011 | Kapoor | .............. | H04N 7/17336 709/231 |
| 8,674,998 B1* | 3/2014 | Schnitzer | ................ | G06T 15/20 345/475 |
| 9,060,190 B2* | 6/2015 | Li | ......................... | G11B 27/105 |
| 9,179,116 B1* | 11/2015 | Liao | ....................... | G11B 27/28 |
| 2002/0167540 A1* | 11/2002 | Dobbelaar | ........... | G11B 27/102 715/716 |
| 2006/0248560 A1* | 11/2006 | Wada | .................... | G11B 27/034 725/89 |
| 2007/0033292 A1* | 2/2007 | Sull | .................... | G06F 17/30796 709/238 |
| 2007/0106810 A1* | 5/2007 | Ryman | .............. | H04L 29/06027 709/230 |
| 2007/0189737 A1* | 8/2007 | Chaudhri | .............. | G06F 3/0482 386/234 |
| 2008/0175273 A1* | 7/2008 | Johansson | .......... | H04N 7/17318 370/473 |
| 2008/0313278 A1* | 12/2008 | Hochberg | ...... | H04N 21/234381 709/204 |

(Continued)

*Primary Examiner* — Nicholas R Taylor
*Assistant Examiner* — Chong G Kim
(74) *Attorney, Agent, or Firm* — Kwan & Olynick LLP (57) ABSTRACT

Mechanisms are provided for presenting a media location browsing interface to facilitate a media search and/or seek. A client device receives a media stream from a streaming server. This client device provides a media location browsing interface after receiving the media stream. This media location browsing interface includes a plurality of key frames representing locations along the media stream that are selectable at the client device. A seek request to play the media stream from a seek location corresponding to one of the plurality of key frames is captured. The client device begins playback of the media stream at the seek location.

20 Claims, 8 Drawing Sheets

(56) References Cited

U.S. PATENT DOCUMENTS

| | | | | |
|---|---|---|---|---|
| 2009/0083781 A1* | 3/2009 | Yang | G11B 27/105 | 725/20 |
| 2009/0172543 A1* | 7/2009 | Cronin | G06F 3/04847 | 715/721 |
| 2009/0249208 A1* | 10/2009 | Song | G11B 27/105 | 715/721 |
| 2009/0249423 A1* | 10/2009 | Li | H04N 7/17336 | 725/116 |
| 2009/0274437 A1* | 11/2009 | Stiers | H04N 5/76 | 386/239 |
| 2009/0276402 A1* | 11/2009 | Stiers | H04N 5/76 | |
| 2009/0313545 A1* | 12/2009 | Kim | G06F 3/0488 | 715/720 |
| 2010/0070523 A1* | 3/2010 | Delgo | G06F 17/3079 | 707/769 |
| 2010/0070876 A1* | 3/2010 | Jain | G06Q 30/02 | 715/748 |
| 2010/0082585 A1* | 4/2010 | Barsook | G06F 17/3079 | 707/706 |
| 2010/0125786 A1* | 5/2010 | Ozawa | G06F 3/04845 | 715/702 |
| 2010/0150520 A1* | 6/2010 | Hopwood | H04N 5/783 | 386/278 |
| 2010/0259645 A1* | 10/2010 | Kaplan | G11B 27/034 | 348/231.99 |
| 2010/0281371 A1* | 11/2010 | Warner | G06F 9/4443 | 715/720 |
| 2011/0013882 A1* | 1/2011 | Kusunoki | G11B 27/034 | 386/241 |
| 2011/0138329 A1* | 6/2011 | Wells | G06F 3/0482 | 715/830 |
| 2011/0161818 A1* | 6/2011 | Viljamaa | G11B 27/28 | 715/720 |
| 2011/0320945 A1* | 12/2011 | Wong | G06F 3/04886 | 715/716 |
| 2012/0005628 A1* | 1/2012 | Isozu | G06F 3/04842 | 715/838 |
| 2012/0062794 A1* | 3/2012 | Hallmarker | H04N 21/23439 | 348/521 |
| 2012/0078899 A1* | 3/2012 | Fontana | G06F 17/3079 | 707/736 |
| 2012/0082432 A1* | 4/2012 | Ackley | G11B 19/025 | 386/241 |
| 2012/0166950 A1* | 6/2012 | Frumar | G06F 3/04883 | 715/719 |
| 2012/0210228 A1* | 8/2012 | Wang | G11B 27/005 | 715/723 |
| 2012/0320013 A1* | 12/2012 | Perez | H04N 9/8205 | 345/207 |
| 2012/0331106 A1* | 12/2012 | Ramamurthy | H04N 21/234327 | 709/218 |
| 2013/0014016 A1* | 1/2013 | Delgo | G06F 17/3079 | 715/723 |
| 2013/0014052 A1* | 1/2013 | Frey | G06F 3/013 | 715/800 |
| 2013/0021529 A1* | 1/2013 | Kim | G06K 9/00751 | 348/700 |
| 2013/0055150 A1* | 2/2013 | Galor | G09G 5/34 | 715/784 |
| 2013/0061263 A1* | 3/2013 | Issa | G06F 17/30817 | 725/32 |
| 2013/0080895 A1* | 3/2013 | Rossman | G06F 3/04883 | 715/720 |
| 2013/0132462 A1* | 5/2013 | Moorer | H04N 21/2343 | 709/203 |
| 2013/0191747 A1* | 7/2013 | Choi | G06F 3/048 | 715/716 |
| 2013/0223812 A1* | 8/2013 | Rossi | H04N 5/772 | 386/224 |
| 2013/0227414 A1* | 8/2013 | Hwang | G06F 3/0485 | 715/719 |
| 2013/0238740 A1* | 9/2013 | Vass | G06F 17/30902 | 709/213 |
| 2013/0290846 A1* | 10/2013 | Calhoun | G06F 17/30023 | 715/719 |
| 2013/0290904 A1* | 10/2013 | Hinman | G06F 17/30244 | 715/835 |
| 2013/0307792 A1* | 11/2013 | Andres | G11B 27/005 | 345/173 |
| 2013/0311885 A1* | 11/2013 | Wang | G06F 3/04845 | 715/719 |
| 2013/0339542 A1* | 12/2013 | Johansson | H04N 7/17318 | 709/231 |
| 2014/0006951 A1* | 1/2014 | Hunter | H04H 60/31 | 715/719 |
| 2014/0136526 A1* | 5/2014 | Calhoun | G06F 17/30796 | 707/723 |
| 2014/0178047 A1* | 6/2014 | Apodaca | G06F 3/041 | 386/248 |
| 2014/0212111 A1* | 7/2014 | Gilley | G06Q 30/02 | 386/282 |
| 2014/0245145 A1* | 8/2014 | Kim | G06K 9/00744 | 715/716 |
| 2014/0245152 A1* | 8/2014 | Carter | G11B 27/28 | 715/720 |
| 2014/0281010 A1* | 9/2014 | Panje | H04L 65/60 | 709/231 |
| 2014/0281035 A1* | 9/2014 | Harrison | H04L 65/605 | 709/247 |
| 2014/0282262 A1* | 9/2014 | Gregotski | H04N 21/2387 | 715/838 |
| 2014/0282661 A1* | 9/2014 | Martin | H04N 21/23418 | 725/18 |
| 2014/0354845 A1* | 12/2014 | Molgaard | H04N 1/215 | 348/222.1 |
| 2014/0380376 A1* | 12/2014 | Schmidt | H04L 65/4084 | 725/54 |
| 2015/0121224 A1* | 4/2015 | Krasnahill, Jr. | H04N 21/4147 | 715/720 |
| 2015/0130892 A1* | 5/2015 | Whynot | H04N 7/152 | 348/14.09 |
| 2015/0221345 A1* | 8/2015 | Zhao | H04N 21/8153 | 386/241 |
| 2015/0346984 A1* | 12/2015 | Flint | G06F 3/04847 | 715/720 |
| 2015/0370402 A1* | 12/2015 | Checkley | H04N 21/41407 | 345/173 |
| 2016/0026638 A1* | 1/2016 | Jin | G06F 17/30424 | 345/418 |
| 2016/0063104 A1* | 3/2016 | Barsook | G06F 17/3079 | 707/722 |
| 2016/0070962 A1* | 3/2016 | Shetty | G06K 9/00718 | 382/225 |
| 2016/0205431 A1* | 7/2016 | Avedissian | G06F 3/0481 | 725/37 |
| 2016/0227295 A1* | 8/2016 | Casey | H04N 21/6587 | |
| 2016/0307596 A1* | 10/2016 | Hardin | H04L 65/40 | |

\* cited by examiner

MEDIA SEEK MECHANISMS

TECHNICAL FIELD

The present disclosure relates to media streams. In one example, the present invention relates to mechanisms for providing a media location browsing interface to facilitate a media seek.

DESCRIPTION OF RELATED ART

Media providers typically allow a user watching streaming video on a media player to seek to another playback location by dragging along, clicking, or otherwise interacting with a scroll bar (also referred to as a slider or scrub bar). For instance, when a user taps a video playing on a mobile device, a tool bar fades into view. The tool bar includes transport controls (sometimes referred to as trick play functionality), such as pause, play, skip back, and skip forward, slow motion, as well as scroll bar used for seeking through the video. The scroll bar is a horizontal bar with a thumb control or slider at the position corresponding to the current media time. As the user drags the slider, trick play static images may be displayed on the full screen. When the user either stops dragging the slider or clicks on a location on the scroll bar, playback of the streaming video can begin from this location. However, because scroll bars and sliders are typically small in size, they can be awkward and frustrating to use.

Typically, scroll bars are very imprecise and difficult to use as navigational tools in most conditions. Particularly for tablets and mobile devices, it is common to be off by several minutes when attempting to seek through a video longer than about 30 minutes when using a scroll bar. Consequently, precise seeking is impossible on conventional mobile devices, especially in "real world" conditions, where it may be bright, noisy, and difficult to see a small scroll bar. In addition, transport controls, which provide the ability to skip through video or other media in fixed time increments, are also very imprecise navigational tools when a user is trying to find a particular location for playback. Accordingly, it is desirable to provide an improved user experience for users wishing to seek to different locations in a media stream.

OVERVIEW OF THE INVENTION

Mechanisms are provided for presenting a media location browsing interface to facilitate a media seek. A client device receives a media stream from a streaming server. This client device provides a media location browsing interface after receiving the media stream. This media location browsing interface includes a plurality of key frames representing locations along the media stream that are selectable at the client device. A seek request to play the media stream from a seek location corresponding to one of the plurality of key frames is captured. The client device begins playback of the media stream at the seek location.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular devices. Specifically, various embodiments will be described in the context of mobile devices. However, it should be noted that the techniques of the present invention can be applied to a variety of different devices, such as personal computers, televisions, tablet devices, set top boxes, dongles, laptops, etc. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. Furthermore, the techniques and mechanisms of the present invention will sometimes describe two entities as being connected. It should be noted that a connection between two entities does not necessarily mean a direct, unimpeded connection, as a variety of other entities may reside between the two entities. Consequently, a connection does not necessarily mean a direct, unimpeded connection unless otherwise noted.

According to conventional systems, media providers allow a user watching streaming video on a media player to seek to another playback location by dragging along, clicking, or otherwise interacting with a scroll bar (also referred to as a slider or scrub bar). However, scroll bars are typically small in size and are very imprecise and difficult to use as navigational tools in most conditions, particularly for tablets and mobile devices. Accordingly, various embodiments described herein relate to providing a media location browsing interface that includes improved seeking mechanisms.

In particular, the media location browsing interface includes displays key frames representing locations along the media stream. These key frames can be selected by the user at a mobile device or other client device. These key frames, which may be lower resolution images of the key frames used in regular playback mode, allow the user to see ahead (or behind) along the media stream to find a desired seek location more precisely. Selection of a particular key frame initiates a seek request to begin playback at the selected key frame, which is also referred to herein as the seek location. Playback then continues at this seek location. In some examples, the media location browsing interface includes a smart seek feature, that allows navigation to a prior viewing location in the media stream. For example, if a user began viewing at a particular spot and wants to rewind to this spot, the smart seek feature allows the user to skip back to this particular spot.

According to various embodiments, reference key frames are included in media streams as part of the data provided to display a video. Various devices have the capability of playing media streams received from a streaming server. One example of a media stream is a Moving Picture Experts Group (MPEG) video stream. Media streams such as MPEG video streams often encode media data as a sequence of frames and provide the sequence of frames to a client device. Some frames are reference key frames that provide substantially all of the data needed to display an image. An MPEG I-frame is one example of a reference key frame. Other frames are predictive frames that provide information about differences between the predictive frame and a reference key frame. MPEG and its various incarnations use I-frames as reference key frames and B-frames and P-frames as predictive frames.

According to various embodiments, key frames used in a media location browsing interface are often lower resolution versions of the images used in reference key frames. In addition, key frames used in a media location browsing interface are often downloaded initially when a user begins playing a media stream. In some cases, the key frames are downloaded as bandwidth is available. Because the reference key frames are typically much higher resolution and much larger data files, the reference key frames are downloaded in buffers as the media stream plays, instead of all at once or initially.

Figure 1:
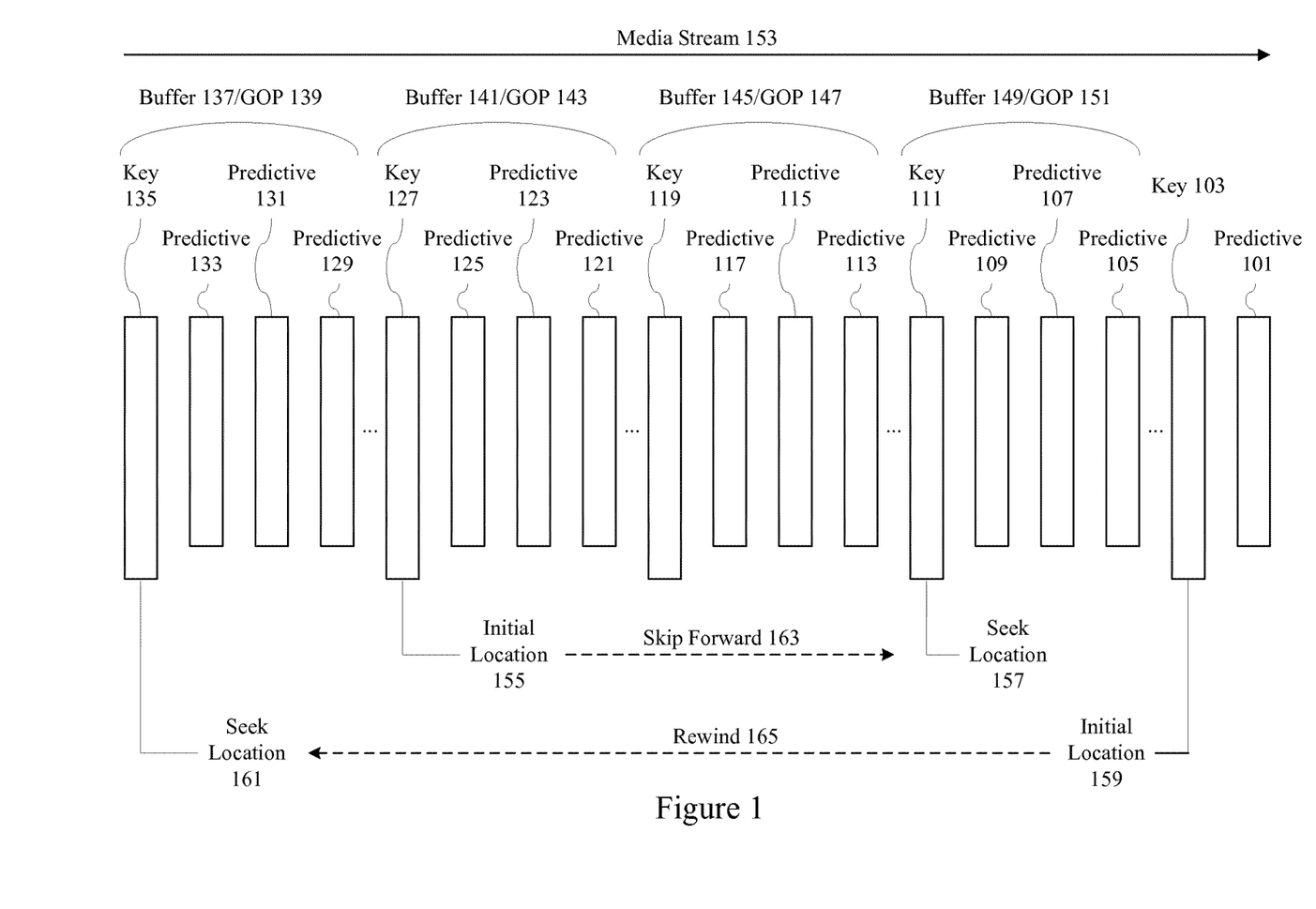
FIG. 1 is a diagrammatic representation showing a sequence of media stream frames.

With reference to FIG. 1, shown is a diagrammatic representation showing a sequence of media stream frames. According to various embodiments, a sequence of frames such as a sequence of video frames is received at a streaming server. In some embodiments, the sequence of video frames is associated with a particular channel and a buffer is assigned to each channel. Other sequences of video frames may be held in other buffers assigned to other channels. In other examples, buffers or portions of buffers are maintained for separate video streams and separate channels. In particular embodiments, reference key frame 135 is received early along the forward play direction of media stream 153. One example of a reference key frame 135 is an I-frame that includes substantially all of the data needed for a client device to display a frame of video. Reference key frame 135 is followed by predictive frames 133, 131, and 129, and can include any number of predictive frames as indicated by the dots following predictive frame 129.

According to various embodiments, a sequence of different frame types, beginning with a reference key frame and ending just before a subsequent reference key frame, is referred to herein as a Group of Pictures (GOP). Reference key frame 135 and predictive frames 133, 131, and 129 are associated with GOP 139 and maintained in buffer 137. An encoding application typically determines the length and frame types included in a GOP. According to various embodiments, an encoder provides the sequence of frames to the streaming server. In some examples, a GOP is 15 frames long and includes an initial reference key frame such as an I-frame followed by predictive frames such as B and P frames. A GOP may have a variety of lengths. An efficient length for a GOP is typically determined based upon characteristics of the video stream and bandwidth constraints. For example, a low motion scene can benefit from a longer GOP with more predictive frames. Low motion scenes do not need as many reference key frames. A high motion scene may benefit from a shorter GOP as more reference key frames may be needed to provide a good user experience.

According to various embodiments, GOP 139 is followed by GOP 143 maintained in buffer 141. GOP 143 includes reference key frame 127 followed by predictive frames 125, 123, and 121. Similarly, GOP 143 is followed by GOP 147 maintained in buffer 145. In addition, GOP 147 is followed by GOP 151 maintained in buffer 149. In some examples, a buffer used to maintain the sequence of frames is a first in first out (FIFO) buffer. When new frames are received, the oldest frames are removed from the buffer. Although a certain number of GOPs and frames are shown, any number of GOPs and frames can be included.

According to various embodiments, a user may wish to seek to another location within the media stream 153 during playback. More specifically, a user may indicate to a client device, such as a mobile device, computer, or other media playback device that the user would like to change the location from which the media stream 153 playback should continue. For example, if the user wants to skip forward 163 from an initial location 155 to a seek location 157, the user can input that request into the client device. In order to select this seek location, the user may want to browse through key frames to determine where playback should continue along the media stream. For this purposes of this disclosure, key frames refer to images or other files corresponding to reference key frames in a media stream. These key frames may be lower resolution images, thumbnails, etc. of the reference key frames according to various examples. As discussed in more detail with regard to the Figures below, these key frames can be presented to a user via a media location browsing interface. In some examples, the client device can then seek to this location to begin playback if the media stream is already buffered on the client device. In other examples, the client device can pass on this seek request to a streaming server that is providing media stream 153.

According to various embodiments, when a user selects a key frame from a media location browsing interface, the media stream can be buffered from this location and playback can begin at or near the location of the corresponding reference key frame. In some examples, the client device or streaming server can identify intermediate key frames between the initial location 155 and the seek location 157, such as key frames 127, 119, and 111. These intermediate key frames are then provided to the client device to play as a sequence before media stream begins playback at seek location 157. In some examples, the intermediate key frames are I-frames and the media stream 153 is a video stream. The sequence of intermediate key frames shown to the user moves logically forward from the user's initial location 155 to the new seek location 157. The sequence of intermediate key frames, which appears to the user as an animation, can then cross-dissolve smoothly into the video (including audio) as it begins playing from seek location 157. This animation of intermediate key frames can be presented to a user to enhance user experience and satisfaction during buffering and any waiting time that may occur between the user's seek request and the playback from the seek location. However, this animation of intermediate key frames may be excluded in some embodiments, especially those where wait times and buffering are very minimal.

Similarly, if a user wants to rewind 165 from an initial location 159 to a seek location 161, the user can input that request into the client device. In order to select this seek location, the user may want to browse through key frames to determine where playback should continue along the media stream. As also discussed in more detail below with regard to the Figures below, these key frames can be presented to a user via a media location browsing interface.

According to various embodiments, intermediate key frames can be identified in numerous ways. In some examples, a streaming server performs processing on each received frame to determine which frames are key frames. As mentioned above, key frames are typically downloaded to a client device prior to a seek request and may include thumbnails or lower resolution images in order to accommodate bandwidth limitations, etc. For example, when a media stream 153 is requested by a user, the key frames may be downloaded initially on the client device in case the user wants to seek sometime during playback. In some examples, the key frames can be downloaded as bandwidth is available, but must be downloaded prior to a seek request. According to various applications, the key frames can be I-frame images stored as jpeg files. The manner in which the key frame images are formatted, stored, and downloaded can vary. For instance, depending on the available bandwidth and processing capabilities, the images can be stored at a lower resolution (such as thumbnails), etc. The higher resolution reference key frames can be buffered and downloaded later for regular playback of the media stream 153.

A media location browsing interface that includes improved seeking mechanisms can be implemented in various ways. FIGS. 2-5 illustrate some examples of media location browsing interfaces and/or features of media location browsing interfaces. It should be noted that aspects of these examples can be interchanged or combined, within the scope of this disclosure.

Figure 2:
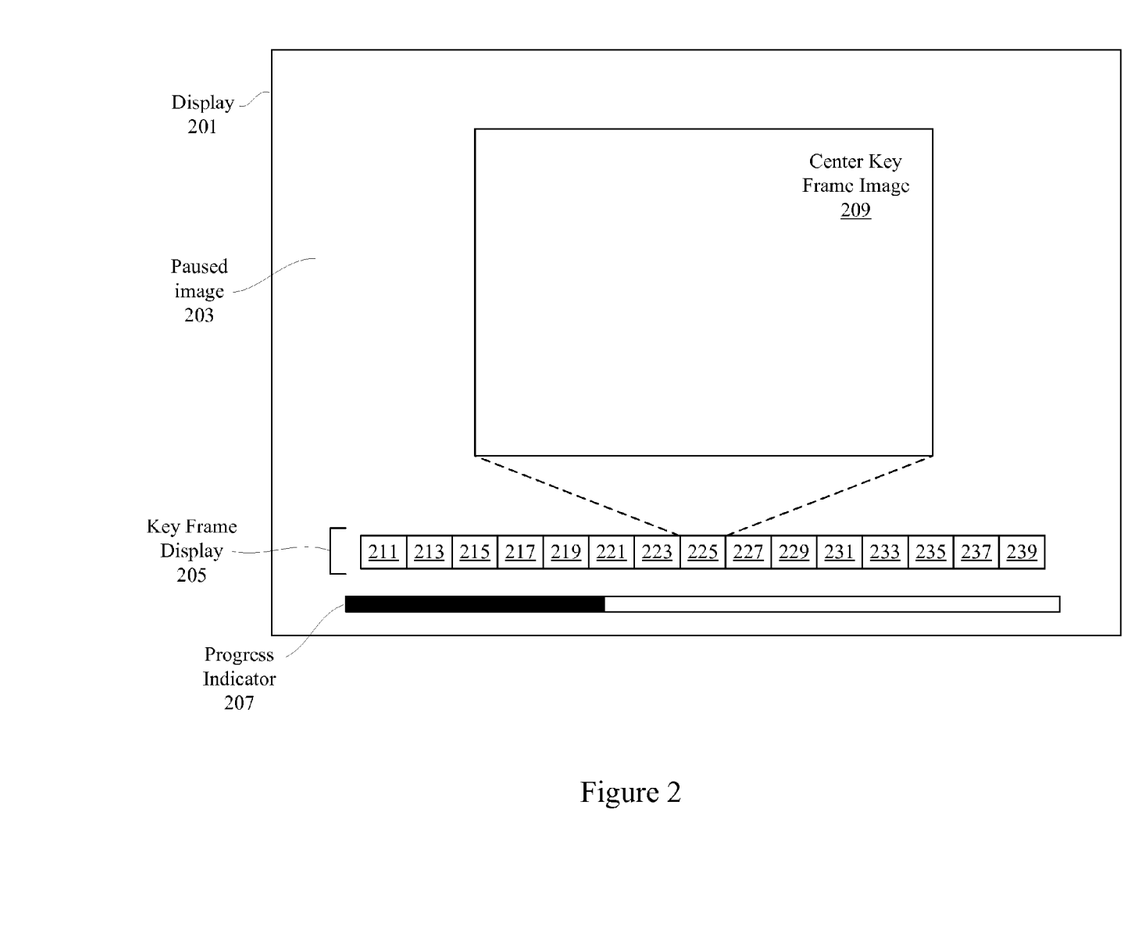
FIG. 2 is a diagrammatic representation showing an example of a media location browsing interface.

With reference to FIG. 2, shown is a diagrammatic representation showing an example of a media location browsing interface. The media location browsing interface shown on display 201 includes a paused image 203, key frame display 205, center key frame image 209, and progress indicator 207. The key frame display 205 replaces the scroll bar of conventional systems with a horizontally tiled list of key frames 211, 213, 215, 217, 219, 221, 223, 225, 227, 229, 231, 233, 235, 237, and 239. According to various examples, the key frames 211, 213, 215, 217, 219, 221, 223, 225, 227, 229, 231, 233, 235, 237, and 239 are small thumbnails, representing still images, and corresponding to locations along the media stream playing on display 201. In the present example, the media stream is a video. Furthermore, each of the key frames 211, 213, 215, 217, 219, 221, 223, 225, 227, 229, 231, 233, 235, 237, and 239 is selectable at a client device, such as a mobile device, associated with the display 201.

In the present embodiment, the key frame display 205 is part of a "filmstrip projection" feature of the media location browsing interface. In particular, the key frame display 205 acts like a "filmstrip." As the video plays, the filmstrip animates right-to-left in synchronization with the video. In some examples, the filmstrip shifts left one image every two to six seconds.

Unlike a traditional scroll bar, the key frame display 205 allows a user to see upcoming and previous still frames, which often hint at scene changes and other events in the video. According to various examples, approximately 10 to 20 frames are shown in the filmstrip, with the current example showing 15 frames. However, any number of frames can be used depending on the application. The key frames 211, 213, 215, 217, 219, 221, 223, 225, 227, 229, 231, 233, 235, 237, and 239 are very small and may only need to convey general context, such as a sunny exterior scene, a dark interior scene, etc. according to various examples. In addition, the key frames 211, 213, 215, 217, 219, 221, 223, 225, 227, 229, 231, 233, 235, 237, and 239 may not be intended to clearly indicate small details, individual characters, etc.

In the present example, a progress indicator 207 is included below the key frame display 205. This progress indicator 207 is used to gauge the current media time in relation to the duration of the video. The progress indicator 207 can be a short, horizontal bar, which is filled with color from the left edge to the point corresponding with the current media time. As the media plays, the colored section grows slowly to the right. As shown, the progress indicator 207 is similar in length to the key frame display 205. However, the progress indicator 207 can be much smaller in some examples, especially when the progress indicator 207 is not intended to be interactive, but rather a visual display of the current playback location of the video.

According to various embodiments, key frame display 205 operates as a "thumbwheel." As such, key frame display 205 can be swiped horizontally, thereby causing the key frame display 205 to scroll freely and slowly decelerate. The key frame display 205 can be "grabbed" while scrolling and can be slowed down or stopped. The key frame display 205 can also be "dragged" left/right, in a manner similar to scrolling up/down in a mobile browser, or any mobile app with a scroll view.

Various features of the present example mimic a film projector that runs a filmstrip through a spool in front of a light bulb. Specifically, the key frame display 205 can be thought of as a film strip, the key frame 225 appearing at the center of the key frame display can be thought of as the image appearing in front of the light bulb, and the center key frame image 209 can be thought of as the projected image on a movie screen or wall.

In the present example, when a user first moves the key frame display 205, the video pauses and the paused image 203 is displayed in the background. A center key frame image 209, which is a still image representing the current media time, zooms out from full screen to occupy approximately ⅔ of the screen. This center key frame image 209 displays a larger version of the key frame 225 appearing at the center of key frame display 205. As the user continues to move the key frame display 205 (i.e., the filmstrip), such as by swiping horizontally, the center key frame image 209 (i.e., the projected image) updates whenever a new key frame 225 crosses the center of the key frame display 205. It is the key frame 225 appearing at the center of the key frame display 205 that is projected as center key frame image 209. When the user swipes the filmstrip and it scrolls freely, the projected images animate and appear as a motion picture. According to various examples, the user controls the speed and the direction (i.e., backwards or forwards) of the key frame display 205. In addition, in some examples, if the filmstrip is scrolled to its beginning or its end, it bounces and stops. If, instead of swiping, the user taps a key frame on the key frame display 205, the key frame display 205 scrolls horizontally to position the tapped frame at the center (in the position shown as 225), and this key frame is "projected" as center key frame image 209.

In the present example, if the user taps the center key frame image 209, the corresponding still image zooms in to fill the full screen and replace paused image 203. The video seeks to this position, and when buffering is complete, the still image fades seamlessly into the video. Alternatively, if the user taps the paused image 203 in the background, the center key frame image 209 fades away, and the video resumes from where it was paused.

The present example can also be understood in the context of seeking as illustrated in FIG. 1. In particular, the skip forward 163 seek request described in FIG. 1 can be shown in the context of the media location browsing interface shown in FIG. 2. Specifically, the paused image 203 corresponds to initial location 155. If the user swipes along key frame display 205, such that key frame 225 corresponds to seek location 157, and the user taps or otherwise selects the center key frame image 209 corresponding to key frame 225 and seek location 157, the video seeks to the seek location 157. The center key frame image 209 zooms out to replace paused image 203 and playback begins from the seek location 157. The center key frame image 209 can fade into regular playback from the seek location. In some examples, when the center key frame image 209 is selected, an animated sequence of key frames appearing between the paused image 203 and the center key frame image 209 can be displayed before playback begins from the seek location 157. Although this animated sequence of key frames can improve user engagement and satisfaction by providing an entertaining experience during seeking and/or buffering, the animated sequence can be omitted in some implementations, such as when seeking and/or buffering occurs over a very short period of time.

The media location browsing interface described in the present example provides numerous advantages over previous systems. In particular, the media location browsing interface includes very intuitive navigation for the user. For instance, the user simply taps the center key frame image 209 to play video at that position, or taps the paused image 203 in the background to resume playback from its current position. In addition, the media location browsing interface greatly improves accuracy of seeking to a specific media time and/or location. Specifically, a user can "peek" before/ahead of the current media location and select a new playback location after browsing the key frame display 205. Because these features improve accuracy and ease of seeking through video, the media location browsing interface increases user engagement and improves user satisfaction. In turn, these features can drive usage of the streaming media service or player providing the video.

Figure 3:
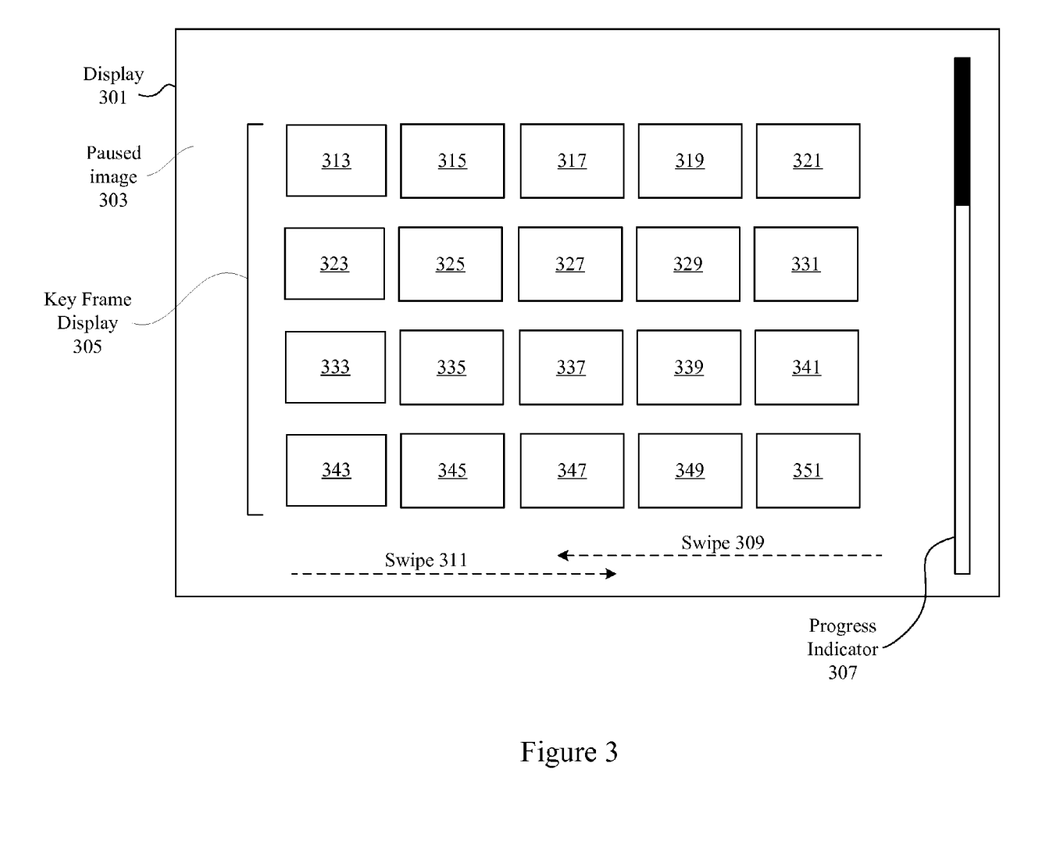
FIG. 3 is a diagrammatic representation showing another example of a media location browsing interface.

With reference to FIG. 3, shown is a diagrammatic representation of another example of a media location browsing interface. The media location browsing interface shown on display 301 includes a paused image 303, key frame display 305, and progress indicator 307. The key frame display 305 replaces the scroll bar of conventional systems with a "drawer" that opens by swiping 309 from the right edge of the screen right-to-left. When the drawer is opened, the video (or other media) that was playing pauses and darkens and a paused image 303 corresponding to this playback location is displayed in the background. The drawer includes a key frame display 305 configured as a grid view (i.e., rows and columns) of key frames 313, 315, 317, 319, 321, 323, 325, 327, 329, 331, 333, 335, 337, 339, 341, 343, 345, 347, 349, and 351. Key frames 313, 315, 317, 319, 321, 323, 325, 327, 329, 331, 333, 335, 337, 339, 341, 343, 345, 347, 349, and 351 are thumbnail images representing locations along the video (or other media stream) at sequential media times. The key frame display 305 allows a user to visualize upcoming and previous sections of the video, and preview scene changes and other events. In some examples, when the media location browsing interface is used on a mobile device, approximately 10-20 key frames may be shown in the key frame display 305. In the present example shown, 20 key frames are included. However, any number of key frames can be included depending on the application. In addition, the key frames may be very small and may only need to convey general context, such as a sunny exterior scene, a dark interior scene, etc. according to various examples. In some instances, the key frames may not be intended to clearly indicate small details, individual characters, etc. As mentioned previously, the paused image 303 remains visible in the background. More specifically, the paused image 303 is visible between the key frames when the key frame display 305 is visible.

In the present example, a user can browse through the key frame display 305. In particular, the user swipes up/down to move forward/backward through the timeline of the video. The key frame display 305 functions as a scrolling view, and gestures typically associated with scrolling views are provided. For instance, the key frame display 305 can be dragged, flicked, stopped, etc. In some examples, if the grid view is scrolled to its beginning or end, it bounces and stops. If a user taps any of the key frames 313, 315, 317, 319, 321, 323, 325, 327, 329, 331, 333, 335, 337, 339, 341, 343, 345, 347, 349, or 351, the selected key frame zooms to replace the paused image 303 and the key frame display 305 disappears. The video seeks to the location associated with the selected key frame. After the media player associated with display 301 seeks/buffers, the selected key frame fades into the playback of the video beginning at the seek location associated with the selected key frame. Alternatively, if the user closes the drawer by swiping 311 from the left edge left-to-right, the video fades in and resumes playback where it left off before opening the drawer.

According to various embodiments, a progress indicator 307 can be included to provide a gauge of the current media time in relation to the duration of the video. As shown, the progress indicator 307 is provided immediately to the right of the key frame display 305. When the key frame display 305 is scrolled to the top, the progress indicator 307 is also at the top. Similarly, when the key frame display 305 is scrolled such that the key frames displayed represent the middle locations of the video, the progress indicator is half full, etc.

The present example can also be understood in the context of seeking as illustrated in FIG. 1. In particular, the skip forward 163 seek request described in FIG. 1 can be shown in the context of the media location browsing interface shown in FIG. 3. Specifically, the user swipes 309 to open the key frame display 305. The video playback pauses and the associated paused image 303 corresponds to initial location 155. If the user taps or otherwise selects key frame 325, corresponding to seek location 157, the video seeks to seek location 157. Key frame 325 zooms out to replace paused image 303 and the key frame display 305 retracts or otherwise disappears. Next, key frame 325 can fade into regular playback from the seek location 157. In some examples, when key frame 325 is selected, an animated sequence of key frames appearing between the paused image 303 and key frame 325 can be displayed before playback begins from the seek location 157. Although this animated sequence of key frames can improve user engagement and satisfaction by providing an entertaining experience during seeking and/or buffering, the animated sequence can be omitted in some implementations, such as when seeking and/or buffering occurs over a very short period of time.

The media location browsing interface described in the present example provides numerous advantages over previous systems. In particular, the media location browsing interface includes very intuitive navigation for the user. For instance, on a mobile device, a user can employ "swipe" and "drag" gestures, which are very natural and intuitive for users of smart phones and tablets. Specifically, the key frame display 305 provides a very convenient and engaging interface for searching, seeking, and previewing still images associated with locations along the video or other media stream. Furthermore, the key frame display 305 feature replaces the typical small scrub bar and slider UI controls associated with previous systems, which can be awkward and frustrating to use. In addition, the media location browsing interface greatly improves accuracy of seeking to a specific media time and/or location. Specifically, a user can "peek" before/ahead of the current media location and select a new playback location after browsing the key frame display 305. Because these features improve accuracy and ease of seeking through video, the media location browsing interface increases user engagement and improves user satisfaction. In turn, these features can drive usage of the streaming media service or player providing the video.

Figure 4:
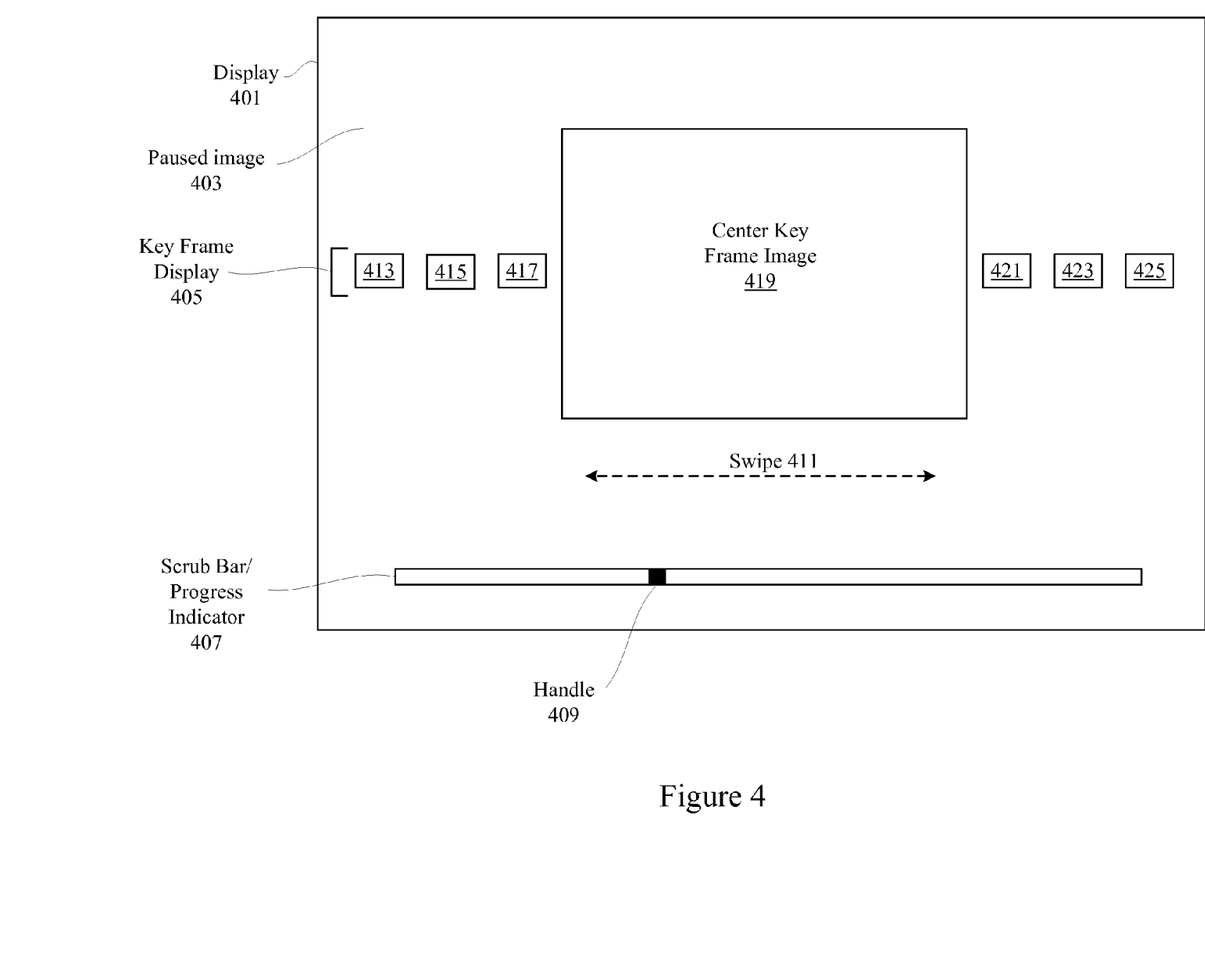
FIG. 4 is a diagrammatic representation showing yet another example of a media location browsing interface.

With reference to FIG. 4, shown is a diagrammatic representation of yet another example of a media location browsing interface. The media location browsing interface shown on display 401 includes a paused image 403, key frame display 405, and scrub bar/progress indicator 407. The key frame display 405 appears when a user swipes anywhere on the display 401 while a video or other media stream is playing. This initial swipe also pauses the video and a paused image 403 corresponding to the pause location is displayed in the background. In some examples, the paused image 403 is darkened with a gray overlay, but still visible. Key frame display 405 includes a "flying tile" containing a static image that zooms into view as center key frame image 419. Center key frame image 419 "floats" above the paused image 403. Initially, the center key frame image 419 matches the paused image 403, to within a few seconds of the media time.

In the present example, the center key frame image 419 (i.e., "flying tile") can be dragged left (forward in time) or right (back in time). Specifically, swiping right-to-left indicates movement forward in time, and left-to-right indicates movement backward in time. This is a very natural and well-understood paradigm on touch devices. As shown, key frame display 405 includes key frames 413, 415, 417, 419, 421, 423, and 425. Key frames 413, 415, 417, 421, 423, and 425 are displayed as a row of thumbnail images representing locations along the video (or other media stream) at sequential media times, whereas center key frame image 419 is shown in an enlarged view. Key frames 413, 415, 417, 421, 423, and 425 may be very small in some examples and may only need to convey general context, such as a sunny exterior scene, a dark interior scene, etc. In some instances, the key frames may not be intended to clearly indicate small details, individual characters, etc. Although six thumbnail sized key frames 413, 415, 417, 421, 423, and 425 are shown, any number of thumbnail sized key frames can be used depending on the application. For instance, if none are used, then only the center key frame image 419 would be visible.

In the present example, when the center key frame image 419 is dragged 411 to either side of the screen, another key frame becomes the center key frame image from the opposite side. In some examples, swiping quickly accelerates the scrolling movement of the key frame display 405. The key frame display 405 functions as a scrolling view, and gestures typically associated with scrolling views are provided. For instance, the key frame display 405 can be dragged, flicked, stopped, etc. In some examples, if the key frame display 405 is scrolled to its beginning or end, it bounces and stops.

According to various embodiments, tapping the center key frame image 419 (i.e., "flying tile") causes the media player to seek to a new playback location corresponding to the center key frame image 419. The center key frame image 419 enlarges to replace paused image 403 and the key frame display 405 disappears. After the media player associated with display 401 seeks/buffers, enlarged center key frame image transitions into the playback of the video beginning at the new playback location. In some instances, the image can cross-dissolve, fade, etc. into normal playback of the video. The effect is that the static image of the enlarged center key frame image becomes a moving video. The process of tapping the center key frame image 419 to play video at that location is a very intuitive and natural action for the user, and provides easy and convenient navigation of video or other media, especially on mobile devices.

In the present embodiment, tapping on the background containing the paused image 403 cancels the video seek. The key frame display 405 fades out or otherwise disappears, and the video fades in and resumes playing from where it left off during the initial swipe. The process of tapping the paused image 403 in the background to resume playback is a very intuitive and natural action for the user, and provides easy and convenient navigation of video or other media, especially on mobile devices.

According to various embodiments, many swipes 411 across key frame display 405 may be needed to seek through a long video. Because swiping through the key frame display 405 alone may be inefficient when a video is long and a user wants to find a particular location in the media stream, especially one that is temporally far away from a current location, a scrub bar/progress indicator 407 is included. As shown, the scrub bar/progress indicator 407 includes a handle 409 that can be used to more quickly move to a new location in the media stream. Similar to traditional scroll bars, the scrub bar/progress indicator 407 is interactive and can be used to navigate to different parts of the media stream.

In the present example, the scrub bar/progress indicator 407 is part of the media location browsing interface that fades into view after the initial swipe 411. Dragging the handle 409 or clicking on a location on the scrub bar/progress indicator 407 updates the image displayed as the center key frame image 419. With the scrub bar/progress indicator 407, a user is able to quickly seek across large media time ranges, just as with conventional media players. When releasing the scrub bar, the user can still swipe across the key frame display 405, then go back and use the scrub bar/progress indicator 407, etc. Accordingly, this media location browsing interface is a hybrid design utilizing aspects of both a scroll bar and a key frame display.

The present example can also be understood in the context of seeking as illustrated in FIG. 1. In particular, the skip forward 163 seek request described in FIG. 1 can be shown in the context of the media location browsing interface shown in FIG. 4. Specifically, the user swipes anywhere on the display 401 while a video or other media stream is playing to pause the video and launch the media location browsing interface, which includes key frame display 405. The paused image 403 associated with the pause location corresponds to initial location 155. The user can swipe 411 to browse along the key frame display 405, and can also use scrub bar/progress indicator 407 as desired. If the user taps or otherwise selects center key frame image 419, corresponding to seek location 157, the video seeks to seek location 157. Key frame 419 zooms out to replace paused image 403 and the key frame display 405 and scrub bar/progress indicator 407 retract or otherwise disappear. Next, the enlarged image of key frame 419 can fade into regular playback from the seek location 157. In some examples, when key frame 419 is selected, an animated sequence of key frames appearing between the paused image 403 and key frame 419 can be displayed before playback begins from the seek location 157. Although this animated sequence of key frames can improve user engagement and satisfaction by providing an entertaining experience during seeking and/or buffering, the animated sequence can be omitted in some implementations, such as when seeking and/or buffering occurs over a very short period of time.

The media location browsing interface described in the present example provides numerous advantages over previous systems. In particular, the media location browsing interface includes very intuitive navigation for the user. For instance, on a mobile device, a user can employ "swipe" and "drag" gestures, which are very natural and intuitive for users of smart phones and tablets. Specifically, the key frame display 305 provides a very convenient and engaging interface for searching, seeking, and previewing still images associated with locations along the video or other media stream. Furthermore, a scrub bar/progress indicator 407 can be used in conjunction with the key frame display 405 to facilitate browsing and seeking. The media location browsing interface described in the present example greatly improves accuracy of seeking to a specific media time and/or location. Specifically, a user can "peek" before/ahead of the current media location and select a new playback location after browsing the key frame display 405. Because these features improve accuracy and ease of seeking through video, the media location browsing interface increases user engagement and improves user satisfaction. In turn, these features can drive usage of the streaming media service or player providing the video.

Figure 5:
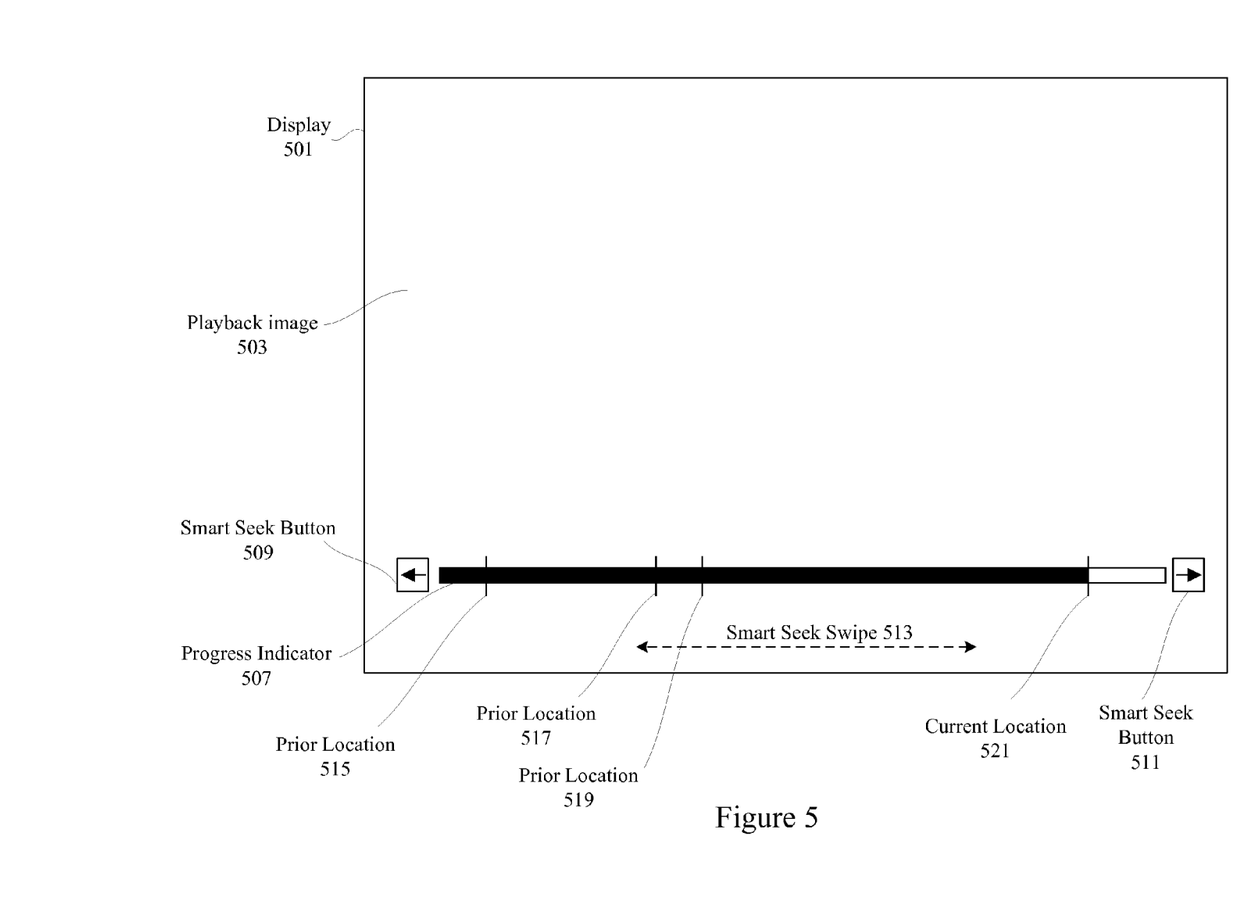
FIG. 5 is a diagrammatic representation showing a smart seek feature for media stream playback.

With reference to FIG. 5, shown is a diagrammatic representation of a smart seek feature for media stream playback. The smart seek feature provides a very convenient, engaging method for searching and seeking through video on mobile, tablet, laptop, desktop, and other devices. In particular, the smart seek feature automatically remembers a user's previous viewing locations, and provides an automatic form of bookmarking. By utilizing back and forward buttons/gestures, the smart seek feature greatly improves accuracy of seeking to a specific media time. For instance, it is very easy to replay a section over and over by navigating to a previous location, watching, and navigating to the previous location again. To skip over watched sections, forward navigation can be used to locate an unwatched section. The smart seek feature can be used alone or in conjunction with the key frame displays and other features described above with regard to FIGS. 2-4. According to various embodiments, the smart seek feature can be considered a media location browsing interface itself, or it can be combined with any other media location browsing interface. In addition, the smart seek feature can be integrated with any bookmarking system, such as MobiTV's personalization service.

In conventional systems, navigational stacks are familiar to users of browsers on all types of devices. In these browsers, users visit a web link and press "back" to visit the previous page, or "forward" to visit the subsequent page. Additionally, conventional systems typically utilize a scroll bar to allow seeking through video on all types of devices and media players. Expanding and improving upon these conventional systems, the smart seek feature utilizes the navigational stack approach, and in some cases, scroll bar features.

In the present example, a display 501 is shown with a playback image 503 representing the current playback location. Smart seek button 509 allows a user to navigate backwards through a navigational stack and smart seek button 511 allows a user to navigate forward through a navigational stack. In some embodiments, the smart seek buttons 509 and 511 are visible during regular playback of the video or other media. However, in other embodiments, the smart seek buttons 509 and 511 may only become visible when a user swipes or otherwise provides input to the device associated with display 501. In addition, smart seek buttons 509 and 511 can be omitted in some applications, such as when the backward and forward navigation is input by swiping the display.

According to various embodiments, a navigational stack is applied to seeking through video. In some examples, the smart seek feature can utilize the intuitive and familiar soft "back" button associated with iPhone devices, the hard "back" button associated with Android devices, and/or the "back" gesture associated with the left edge swipe on iPhone devices. For instance, a user can press the "back" smart seek button 509 (or otherwise perform a back gesture, such as a swipe) to seek the video to a previous "seeked position," or to the beginning of the video, if no previous seek actions were performed. The user can press the "forward" smart seek button 511 to seek to the next position seeked (if any). Pressing the "forward" button works as the back button in reverse. Seeking "pushes" a new position to the current position of the navigational stack, and positions above are removed (analogous to clicking a link in a web browser). The navigational functionality provided during smart seek is analogous to the functionality of a browser used for surfing the web.

In the present example, a progress indicator 507 includes a current location 521 along the video and prior locations 515, 517, and 519 that were previously navigated to or from. The playback image 503 displayed represents either a moving or still image associated with the current location 521 of video playback. The prior locations 515, 517, and 519 are associated with the following navigation sequence. In particular, the video played from the beginning through the intro, and after the intro, the credits were skipped using the slider/scrub bar from prior location 515 to the first scene at 517. Viewing continued for five minutes to prior location 519 and then the video seeked to current location 521. In this example, pressing the "back" smart seek button 509 initiates seek to prior location 519. Pressing the "back" smart seek button 509 again goes to the prior locations 517, 515, and the beginning, in sequence. In this manner, a user can seek through video or other media stream in an intelligent and precise manner. Similarly, a user can seek forward, etc. through the video or other media stream.

As with the previous examples, when seeking to another location in the video, the media player can present an animated sequence of key frames appearing between the current location 521 and the seek location (i.e., prior location sought with the smart seek feature). Although this animated sequence of key frames can improve user engagement and satisfaction by providing an entertaining experience during seeking and/or buffering, the animated sequence can be omitted in some implementations, such as when seeking and/or buffering occurs over a very short period of time.

The smart seek feature described in the present example provides numerous advantages over conventional systems. In particular, the smart seek feature includes very intuitive navigation for the user to find previous locations in a video. Without the smart seek feature described in this example, the user would have to use the traditional scroll bar to seek back and forth through to desired positions in the video. Because those controls are very imprecise and difficult to use in most conditions, seeking with traditional scroll bars can be off by several minutes, especially on tablets and mobile devices. In contrast, the smart seek feature allows the user to find precise locations to facilitate watching unwatched portions of the video, playing back a certain portion of video, etc. Additionally, the smart seek feature can be used on various devices, such as mobile devices, laptop/desktop devices, tablets, etc., and can include features such as bookmarking. By providing more precise and easier to use navigation controls, the smart seek feature can increase user engagement, drive usage, and improve user satisfaction.

Improved navigation for searching and seeking through video or other media streams, examples of which are described above, can be provided via a client device, and in some cases, in conjunction with a streaming server. In some examples, a media location browsing interface and seeking capabilities can be handled by the client device. In other examples, a streaming server can be used in conjunction with the client device to provide these capabilities. For instance, a streaming server can provide streaming media content to the client device and may also receive and respond to seek requests when the media content is delivered gradually in packets or buffers. If a seek request is made at the client device for content that has not yet been buffered at the client device, the streaming server may assist by providing content in response to the seek request.

Figure 6:
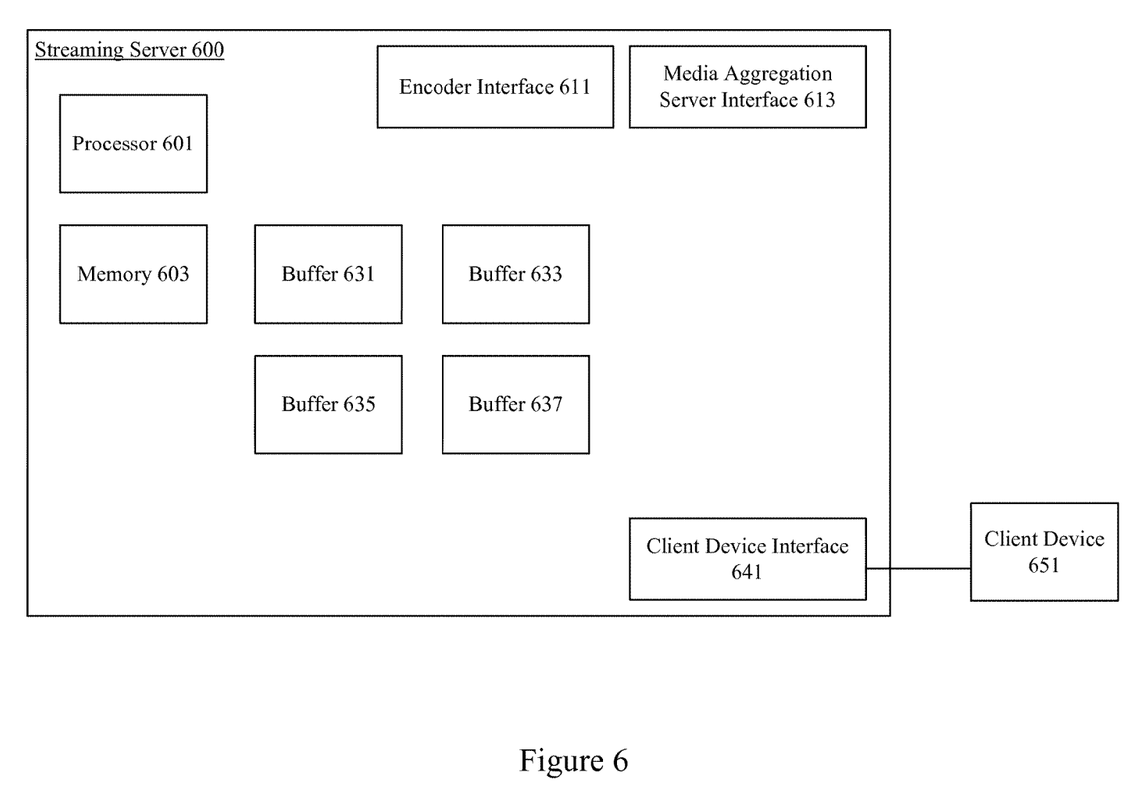
FIG. 6 is a diagrammatic representation of a streaming server.

With reference to FIG. 6, shown is a diagrammatic representation of one example of a streaming server. Although one particular example showing particular devices is provided, it should be noted that the techniques of the present invention can be applied to a variety of streaming servers and networks. According to various embodiments, a streaming server is provided with video streams from an associated encoder and handles connection requests from client devices such as computer systems, mobile phones, personal digital assistants, video receivers, and/or any other device having the capability of decoding a video stream.

In the present example, the streaming server 600 includes a processor 601, memory 603, buffers 631, 633, 635, and 637, and a number of interfaces. In some examples, the interfaces include an encoder interface 611, a media aggregation server interface 613, and a client device interface 641. The encoder interface 611 and the media aggregation server interface 613 are operable to receive media streams such as video streams.

Media content can be provided from a number of different sources through media aggregation server interface 613. According to various embodiments, media content may be provided from film libraries, cable companies, movie and television studios, commercial and business users, etc. and maintained at a media aggregation server. Any mechanism for obtaining media content from a large number of sources in order to provide the media content to mobile devices in live broadcast streams is referred to herein as a media content aggregation server. The media content aggregation server may be clusters of servers located in different data centers. According to various embodiments, content provided to a media aggregation server is provided in a variety of different encoding formats with numerous video and audio codecs. Media content may also be provided via satellite feed.

According to various embodiments, the encoder interface 611 can allow streaming server 600 to interact with an encoder farm. An encoder farm can be associated with a satellite feed and can also be associated with a media aggregation server. The encoder farm can be used to process media content from the satellite feed as well as possibly from the media aggregation server into potentially numerous encoding formats. The media content may also be encoded to support a variety of data rates. The media content from the media aggregation server and encoder farm can be provided as live media to streaming server 600. According to various embodiments, the encoder farm converts video data into video streams such as MPEG video streams with key frames and predictive frames. In some examples, hundreds of video streams associated with hundreds of channels are continuously being received and maintained in buffers 631, 633, 635, and 637 before being provided to client devices through client device interface 641. According to various embodiments, buffers 631, 633, 635, and 637 are provided on a per channel basis. In other examples, buffers are provided on a per GOP basis. Although buffers 631, 633, 635, and 637 are shown as discrete entities, it should be recognized that buffers 631, 633, 635, and 637 may be individual physical buffers, portions of buffers, or combinations of multiple physical buffers. In some examples, virtual buffers are used and portions of a memory space are assigned to particular channels based on need.

According to various embodiments, the streaming server 600 can handle numerous connection requests from various client devices, one of which is shown as client device 651. Connection requests can result from a variety of user actions such as a seek request, channel change, application launch, program purchase, etc. Possible client devices 651 include mobile devices, personal digital assistants (PDAs), cellular phones, personal computing devices, computer systems, television receivers, etc. According to particular embodiments, the client device can be a mobile device connected to a wireless local area network (WLAN) or some other wireless network. The mobile device can communicate with the streaming server 600 over a wireless network. Live media streams provided over RTSP can be carried and/or encapsulated on any one of a variety of networks. Alternatively, the client devices can be connected to a cellular network run by a cellular service provider. Cell towers typically provide service in different areas.

Although a particular streaming server 600 is described, it should be recognized that a variety of alternative configurations are possible. For example, some modules such as a media aggregation server interface may not be needed on every server. Alternatively, multiple client device interfaces for different types of client devices may be included. A variety of configurations are possible.

Figure 7:
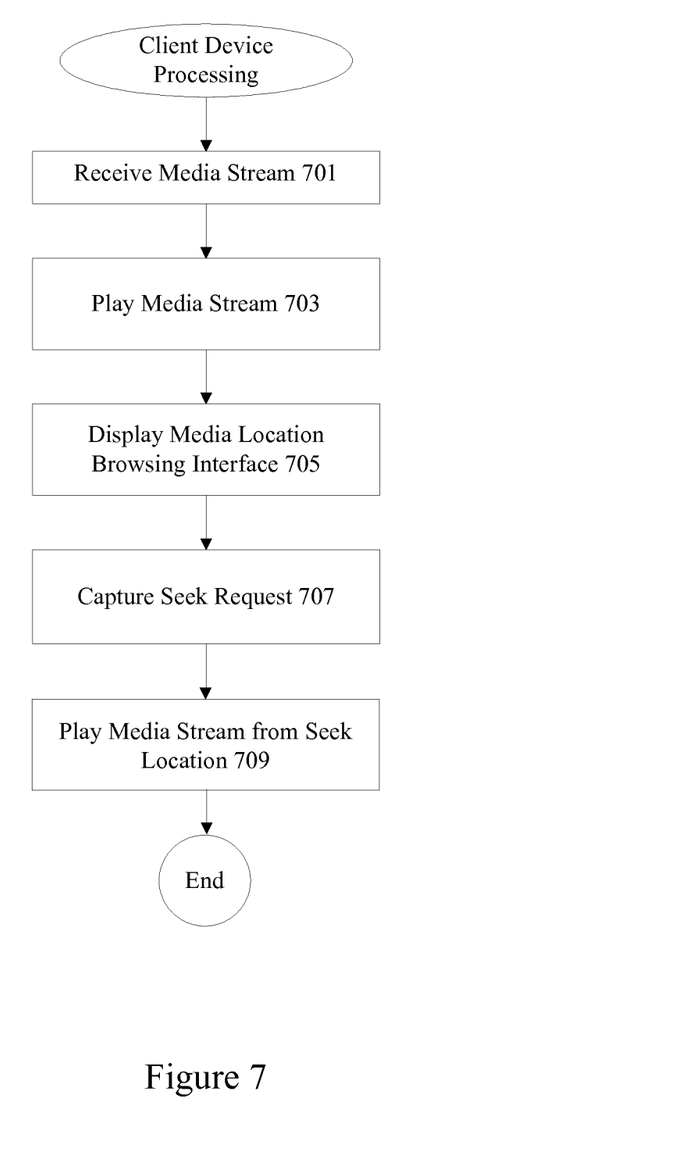
FIG. 7 is a flow process diagram showing processing at a client device.

As described above with regard to various examples, an improved navigation interface for searching and seeking through media content is provided at a client device. With reference to FIG. 7, shown is a flow process diagram showing one example of processing that can be performed at a client device. In the present example, a client device receives a media stream from a streaming server at 701. The client device plays the media stream at 703. At 705, the client device displays a media location browsing interface. As described above with regard to various embodiments, the media location browsing interface can include a key frame display, which includes one or more key frames representing locations along the media stream, and a progress indicator displaying a relative location of the key frame display along the media stream. This media location browsing interface may be displayed in response to user input such as a swipe, tap, etc. In some examples, as described above, this user input may prompt both the display of a media location browsing interface and pausing of the media stream playback at a paused playback location (also known as the initial location in various examples). An image corresponding to the paused playback location may also be displayed in the background when the media location browsing interface is displayed.

In the present example, the media location browsing interface is navigable by a user, and the user can select one of the key frames from the media location browsing interface to initiate a seek request at the client device. In some embodiments, the seek request may be initiated by a smart seek feature, as described above with particular reference to FIG. 5. The seek request is captured or otherwise received at the client device at 707. In the present example, capturing a seek request includes receiving user input, such as a selection of a key frame by tapping, etc. As also described above with regard to various embodiments, the seek request includes a request to begin playback from a location in the media stream corresponding to the key frame displayed (or from the previous location when using the smart seek feature).

In the present example, the seek request is then processed either at the client device or a streaming server, depending on the arrangement or configuration of the client device and streaming server. For instance, if the client device has the appropriate content downloaded such that the client device can process the seek request independently, the client device may carry out the seek request. In other instances, the streaming server may receive the seek request and provide the appropriate content to the client device, which the client device then presents to the user. Once the seek request has been processed and the video or other media stream is ready to play from the seek location, the client device plays the content from the seek location at 709.

Figure 8:
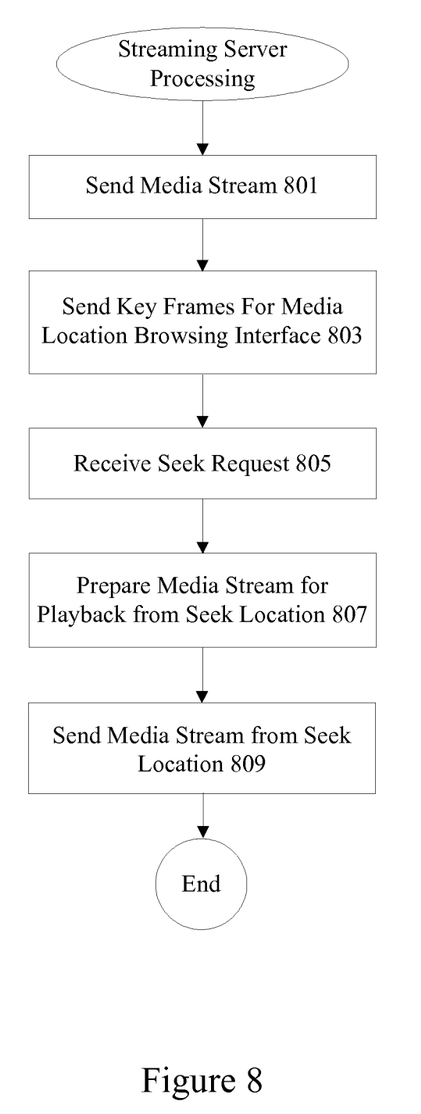
FIG. 8 is a flow process diagram showing processing at a streaming server.

As described above with regard to various examples, an improved navigation interface for searching and seeking through media content is provided at a client device that may interact with a streaming server. With reference to FIG. 8, shown is a flow process diagram of one example of processing that can be performed at a streaming server. In the present example, the streaming server sends a media stream 801 to a client device. Depending on the application, this can be an intermittent or continuous process of sending data to the client device. At 803, the streaming server can send key frames for the media location browsing interface. According to various examples, these key frames can be sent initially when the client requests the media stream. As described in more detail above, the key frames can be lower resolution versions of the original reference key frames and can be downloaded initially before playback begins or as bandwidth becomes available.

Next, in the present example, the streaming server receives a seek request at 805. As also discussed above, a seek request received at the client device may be passed on to the streaming server in some examples. In such examples, the streaming server then prepares the media stream for playback from the requested seek location at 807. Specifically, the streaming server prepares to send the media stream to the client device beginning at the seek location. Next, the streaming server sends the media stream to the client device at 809. This media stream can be sent intermittently as bandwidth is available, or continuously, depending on the application.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method for an improved seek mechanism in a media location browsing interface, comprising:
    sending a request to play a media stream from a client device;
    initially downloading from a streaming server, a plurality of key frames of the media stream for presentation in a key frame display instead of a horizontal scroll bar in the media location browsing interface of the client device, the plurality of key frames corresponding to locations along the media stream and being displayed as thumbnails, the plurality of key frames being downloaded before a seek request is captured;
    receiving the media stream from the streaming server at the client device;
    presenting key frames in the key frame display as a thumbwheel in place of a horizontal scroll bar, wherein the thumbwheel is configured to scroll freely and slowly decelerate when swiped horizontally;
    capturing a seek request to play the media stream from a seek location, wherein the seek location corresponds to one of the plurality of key frames; and
    beginning playback of the media stream at the seek location.

2. The method of claim 1, wherein capturing a seek request includes receiving user input.

3. The method of claim 1, further comprising pausing playback of the media stream at a paused playback location and displaying a paused image corresponding the paused playback location when the media location browsing interface is displayed.

4. The method of claim 1, wherein the media location browsing interface includes a key frame display navigable by user action, and a progress indicator displaying a relative location of the key frame display along the media stream.

5. The method of claim 1, wherein the media location browsing interface includes a smart seek feature, wherein selection of the smart seek feature initiates navigation to a prior viewing location in the media stream.

6. The method of claim 5, wherein the smart seek feature includes a button that can be selected by a user at the client device.

7. The method of claim 5, wherein the smart seek feature is activated by user action, wherein the user action includes swiping across a display associated with the client device.

8. The method of claim 1, wherein the media stream is playing at an initial location at the time of the seek request; and further comprising:
   identifying intermediate key frames between the initial location and the seek location; and
   displaying the intermediate key frames at the client device before beginning playback of the media stream at the seek location.

9. The method of claim 1, wherein the key frames are I-frames.

10. The method of claim 1, wherein the media stream is a video stream.

11. The method of claim 1, wherein the client device is a mobile device.

12. The method of claim 11, wherein the mobile device communicates with the streaming server over a wireless network.

13. The method of claim 1, wherein the key frames are downloaded to the client device prior to the seek request.

14. The method of claim 1, wherein the key frames representing locations along the media stream are lower resolution images of reference key frames associated with regular playback of the media stream.

15. A system, comprising:
   a processor; and
   memory, the memory storing instructions to cause the processor to execute a method, the method comprising:
      sending a request to play a media stream from a client device;
      initially downloading from a streaming server, a plurality of key frames of the media stream for presentation in a key frame display instead of a horizontal scroll bar in the media location browsing interface of the client device, the plurality of key frames corresponding to locations along the media stream and being displayed as thumbnails, the plurality of key frames being downloaded before a seek request is captured;
      receiving the media stream from the streaming server at the client device;
      presenting key frames in the key frame display as a thumbwheel in place of a horizontal scroll bar, wherein the thumbwheel is configured to scroll freely and slowly decelerate when swiped horizontally;
      capturing a seek request to play the media stream from a seek location, wherein the seek location corresponds to one of the plurality of key frames; and
      beginning playback of the media stream at the seek location.

16. The system of claim 15, wherein capturing a seek request includes receiving user input.

17. The system of claim 15, wherein the processor is further configured to paused playback of the media stream at a paused playback location and display a paused image corresponding the paused playback location when the media location browsing interface is displayed.

18. The system of claim 15, wherein the media location browsing interface includes a key frame display navigable by user action, and a progress indicator displaying a relative location of the key frame display along the media stream.

19. The system of claim 15, wherein the media location browsing interface includes a smart seek feature, wherein selection of the smart seek feature initiates navigation to a prior viewing location in the media stream.

20. A non-transitory computer readable medium storing instructions to cause a processor to execute a method, the method comprising:
   sending a request to play a media stream from a client device;
   initially downloading from a streaming server, a plurality of key frames of the media stream for presentation in a key frame display instead of a horizontal scroll bar in the media location browsing interface of the client device, the plurality of key frames corresponding to locations along the media stream and being displayed as thumbnails, the plurality of key frames being downloaded before a seek request is captured;
   receiving the media stream from the streaming server at the client device;
   presenting key frames in the key frame display as a thumbwheel in place of a horizontal scroll bar, wherein the thumbwheel is configured to scroll freely and slowly decelerate when swiped horizontally;
   capturing a seek request to play the media stream from a seek location, wherein the seek location corresponds to one of the plurality of key frames; and
   beginning playback of the media stream at the seek location.

* * * * *